United States Patent [19]

Sato et al.

[11] Patent Number: 5,309,559
[45] Date of Patent: May 3, 1994

[54] PICTURE PROCESSING DEVICE HAVING AN EDITING FUNCTION OF INPUT CONCATENATED-COMMAND

[75] Inventors: Akihiko Sato; Masayoshi Hamada, both of Tokyo, Japan

[73] Assignee: NEC Corporation, Tokyo, Japan

[21] Appl. No.: 843,073

[22] Filed: Feb. 28, 1992

[30] Foreign Application Priority Data

Feb. 28, 1991 [JP] Japan .................................. 3-033757

[51] Int. Cl.$^5$ .............................................. G06F 15/20
[52] U.S. Cl. .................................. 395/162; 395/375; 395/500
[58] Field of Search .................... 395/100, 162–164, 395/375, 700, 500

[56] References Cited

U.S. PATENT DOCUMENTS 4,839,797 6/1989 Katori et al. ........................ 364/200

Primary Examiner—Dale M. Shaw
Assistant Examiner—Kee M. Tung
Attorney, Agent, or Firm—Foley & Lardner

[57] ABSTRACT

On processing an input picture into a processed picture in compliance with an input concatenated-command, a command editing unit edits the input concatenated-command into an edited concatenated-command which is equivalent in function to the input concatenated-command and is less in length than the input concatenated-command. A command executing unit executes the edited concatenated-command for the input picture to produce the processed picture. Preferably, the command editing unit has a dividing unit which processes the input concatenated-command into a succession of elementary commands. A combining unit combines the elementary commands into the edited concatenated-command by deleting, from the succession of the elementary commands, a succession of a particular elementary command and an inverse elementary command which immediately succeeds the particular elementary command and is inverse in function to the particular elementary command. Alternatively, the combining unit may produce the edited concatenated-command by substituting an equivalent elementary command for a succession of a specific elementary command and a succeeding elementary command which immediately succeeds the specific elementary command and is equivalent in function to the succession of the specific and the succeeding elementary commands. The input concatenated-command is typically a concatenation of input commands, each of which is greater in length than each elementary command.

7 Claims, 2 Drawing Sheets

PICTURE PROCESSING DEVICE HAVING AN EDITING FUNCTION OF INPUT CONCATENATED-COMMAND

BACKGROUND OF THE INVENTION

This invention relates to a picture or image processing device.

A picture processing device of the type described, is supplied with an input picture or image and supplied with an input concatenated-command for the input picture. The picture processing device processes the input picture into a processed picture in compliance with the input concatenated-command. The input concatenated-command is typically a concatenation of input commands or input processing commands.

A conventional picture processing device comprises a command executing unit. Supplied with the input picture and with the input concatenated-command, the command executing unit executes the input concatenated-command for the input picture to produce the processed picture. That is, the command executing unit executes the input commands one by one for the input picture.

Inasmuch as the input picture comprises a great number of picture elements, the picture processing device is generally implemented by the use of a plurality of picture processing LSI's (large scale integration circuits) in order to process the input picture at a high speed. However, the picture processing device can not process the input picture at a short time when the input concatenated-command comprises an increased number of input commands and is therefore large in length.

The input concatenated-command is formed in a host device by a user to be supplied to the picture processing device. Likewise, the input picture is prepared by the user in the host device to be supplied to the picture possessing device.

Inasmuch as the input concatenated-command is directly supplied from the host device to the executing unit of the conventional picture processing device as it is, the user is compelled to form the input concatenated-command of a reduced length in order to make the picture processing device process the input picture for a short time. Obtaining the input concatenated-command of a reduced length compels the user to have high competence and to consume much time and a great deal of labor.

SUMMARY OF THE INVENTION

It is therefore an object of this invention to provide a picture processing device, wherein a user of the picture processing device is not compelled to form an input concatenated-command of a reduced length in order to make the picture processing device process the input picture for a short time.

It is another object of this invention to provide a picture processing device of the type described, which can process the input picture for a short time without need of high competence of the user and without need of much time and a great deal of labor of the user.

It is yet another object of this invention to provide a picture processing device of the type described, which has an editing unit for editing an input concatenated-command into an edited concatenated-command which is equivalent in function to the input concatenated-command and less in length than the input concatenated-command and which is supplied to a command executing unit of the picture processing device.

Other object of this invention will become clear as the description proceeds.

On describing the gist of this invention, it is possible to understand that a picture processing device is supplied with an input picture and supplied with an input concatenated-command for the input picture for processing the input picture into a processed picture in compliance with the input concatenated-command.

According to this invention, the above-understood picture processing device comprises: command editing means supplied with the input concatenated-command for editing the input concatenated-command into an edited concatenated-command which is equivalent in function to the input concatenated-command and is less in length than the input concatenated-command; and command executing means connected to the command editing means and supplied with the input picture for executing the edited concatenated-command for the input picture to produce the processed picture.

DESCRIPTION OF THE PREFERRED EMBODIMENT

Figure 1:
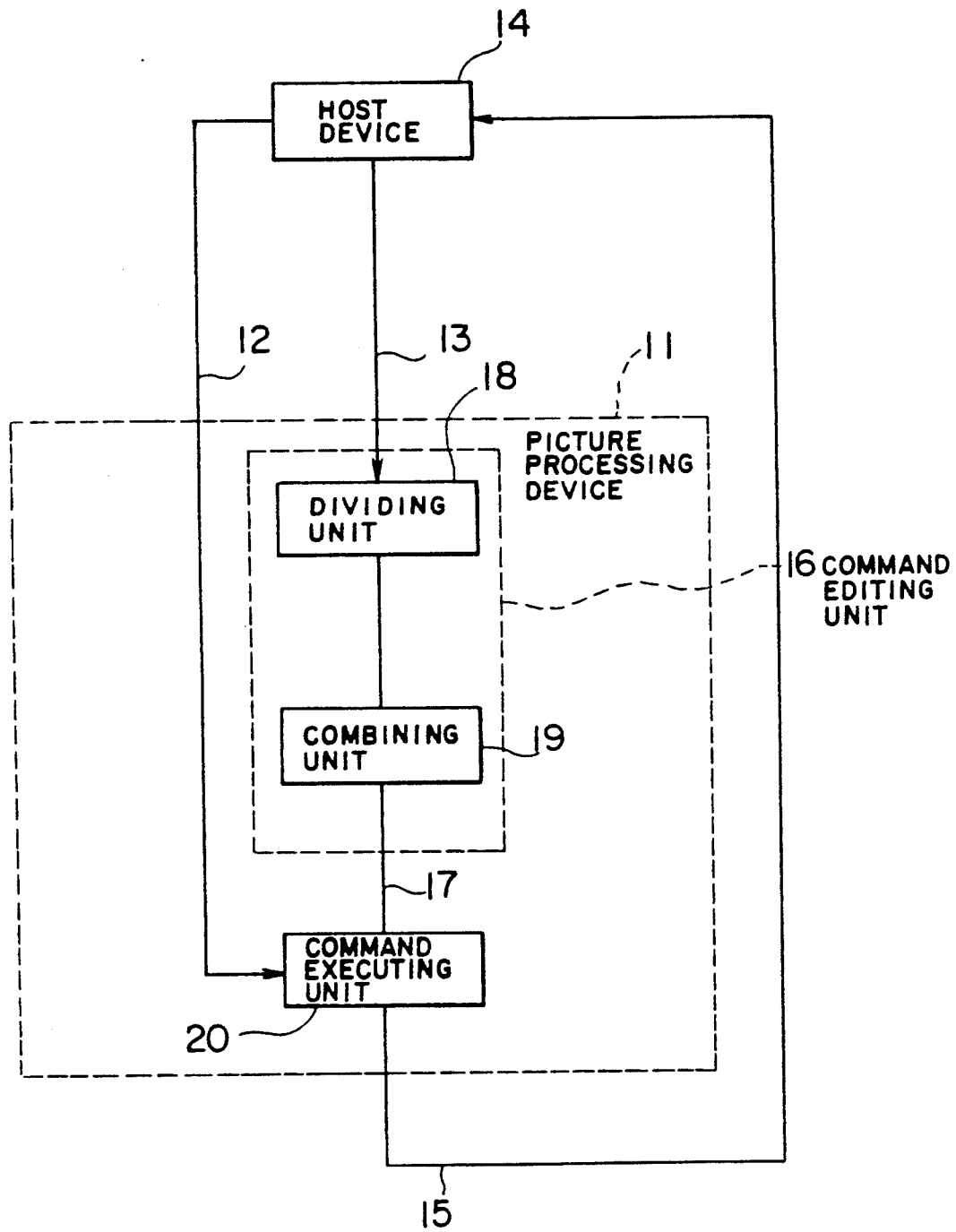
FIG. 1 is a block diagram of a picture processing system comprising a picture processing device according to an embodiment of this invention.

Referring to FIG. 1, a picture processing system comprises a picture processing device 11 according to a preferred embodiment of this invention. The picture processing device 11 is supplied with an input picture or image 12 and also supplied with an input concatenated-command 13 for the input picture 12. A user of the picture processing system inputs the input picture 12 and the input concatenated-command 13 in a host device 14 to make the host device 14 supply the input picture 12 and the input concatenated-command 13 to the picture processing device 11. The picture processing device 11 is for processing the input picture 12 into a processed picture 13 in compliance with the input concatenated-command 13.

Figure 2:
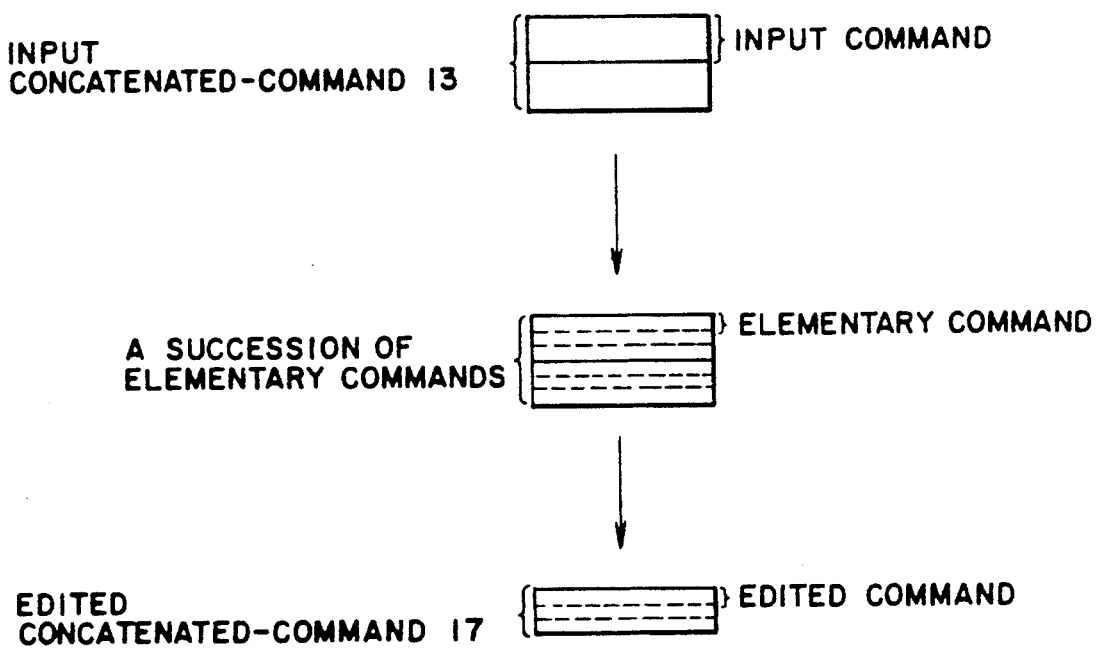
FIG. 2 is a block diagram for use in describing operation of the picture processing device illustrated in FIG. 1.

Turning to FIG. 2, an example of the input concatenated-command 13 is illustrated in a top portion of the figure. The input concatenated-command 13 is a concatenation of input commands or input processing commands. Each input command has a form of a macro command known in the art. The concatenation of the input commands is supplied to the picture processing device 11 (FIG. 1) in the form of a command list as shown in the top portion of the figure.

Turning back to FIG. 1, the picture processing device 11 comprises a command editing unit 16 supplied with the input concatenated-command 13. The command editing unit 16 edits the input concatenated-command 13 into an edited concatenated-command 17 so that the edited concatenated-command 17 is equivalent in function to the input concatenated-command 13 and is less in length than the input concatenated-command 13 in the manner which will become clear as the description proceeds. More exactly, the command editing unit 16 edits the concatenation of the input commands into a concatenation of edited commands so that the concatenation of the edited commands is equivalent in function to the concatenation of the input commands and is less in length that the concatenation of the input commands. The concatenation of the edited commands is for use as the edited concatenated-command 17.

The command editing unit 16 comprises a dividing unit 18. Supplied with the input concatenated-command 13, the dividing unit 18 divides the input concatenated-command 13 into elementary commands to successively produce the elementary commands as a succession of the elementary commands. More particularly, the dividing unit 18 is supplied with the concatenation of the input commands for dividing the concatenation of the input commands into the elementary commands to successively produce the elementary commands as the succession of the elementary commands.

Turning to FIG. 2 again, an example of the succession of the elementary commands is illustrated in a middle portion of the figure. Each of the elementary commands is less in length that in each of the input commands.

It will be supposed that a first one of the input commands of the input concatenated-command 13 is a micro command indicating that "a picture A (corresponding to the input picture 12 of FIG. 1) is successively subjected to MH (Modified Huffman) expansion, right-angled rotation, and MR (Modified Relative Element Address Designate) compression to be produced as a first processed picture B". It will also be supposed that a second one of the input commands of the input concatenated-command 13 is another micro command indicating that "the processed picture B is successively subjected to MR expansion, reduction by one-half, and MR compression to be produced as a second processed picture C corresponding to the processed picture 15 (FIG. 1)".

The dividing unit 18 (FIG. 1) divides the first one of the input commands into first, second, and third elementary commands. The first elementary command indicates that "the picture A is subjected to the MH expansion to be produced as a picture W". The second elementary command indicates that "the picture W is subjected to the right-angled rotation to be produced as a picture V". The third elementary command indicates that "the picture V is subjected to the MR compression to be produced as the first processed picture B".

Likewise, the dividing unit 18 divides the second one of the input commands into fourth, fifth, and sixth elementary commands. The fourth elementary command indicates that "the first processed picture B is subjected to the MR expansion to be produced as a picture U". The fifth elementary command indicates that "the picture U is subjected to the reduction by one-half to be produced as a picture X". The sixth elementary command indicates that "the picture X is subjected to the MR compression to be produced as the second processed picture C corresponding to the processed picture 15".

Turning back to FIG. 1 again, a combining unit 19 is connected to the dividing unit 18. The combining unit 19 has a deletion rule and combines, in accordance with the deletion rule, the elementary commands into the concatenation of the edited commands that is for use as the edited concatenated-command 17. More specifically, the combining unit 18 deletes, from the succession of the elementary commands, a succession of a particular and an inverse one of the elementary commands in accordance with the deletion rule. The inverse one of the elementary commands immediately succeeds the particular one of the elementary commands in the succession of the elementary commands and is inverse in function to the particular one of the elementary commands.

The particular and the inverse ones of the elementary commands will be referred to as a particular and an inverse elementary command. The particular elementary command corresponds to the third elementary command indicating that "the picture V is subjected to the MR compression to be produced as the first processed picture B". The inverse elementary command corresponds to the fourth elementary command indicating that "the first processed picture B is subjected to the MR expansion to be produced as the picture U". The combining unit 19 therefore deletes a succession of the third and the fourth elementary commands from the succession of the elementary commands and modifies the fifth elementary command into a modifies elementary command indicating that "the picture V is subjected to the reduction by one-half to be produced as the picture X".

The combining unit 19 further has a substitution rule to combine the elementary commands into the edited concatenated-command 17. In accordance with the substitution rule, the combining unit 19 substitutes an equivalent elementary command for a succession of a specific and a succeeding one of the elementary commands. The succeeding one of the elementary commands immediately succeeds the specific one of the elementary commands in the succession of the elementary commands. The equivalent elementary command is equivalent in function to the succession of the specific and the succeeding ones of the elementary commands. The specific and the succeeding ones of the elementary commands will be referred to as a specific and a succeeding elementary command.

The equivalent elementary command is, for example, an affine transformation elementary command indicating that "a picture Y is subjected to affine transformation to be produced as a picture Z". In this case, the combining unit 19 has the substitution rule representing that the affine transformation elementary command is equivalent in function to the succession of the specific and the succeeding elementary commands indicating that "the picture Y is subjected to the right-angled rotation to be produced as a picture Q" and that "the picture Q is subjected to the reduction by one-half to be produced as the picture Z", respectively. In short, the affine transformation is equivalent in function to a succession of the right-angled rotation and the reduction by one-half. Supplied, as the succession of the specific and the succeeding elementary commands, with a succession of the second and the modified elementary commands indicating that "the picture W is subjected to the right-angled rotation to be produced as the picture V" and the "the picture V is subjected to the reduction by one-half to be produced as the picture X", the combining unit 19 substitutes the affine transformation elementary command for the succession of the second and the modified elementary commands.

Eventually, the combining unit 19 produces a concatenation of first, second, and third edited commands as the edited concatenated-command 17. The first edited command indicates "the picture A is subjected to the MH expansion to be produced as the picture Y". The second edited command indicates "the picture Y is subjected to the affine transformation to be produced as the picture Z". The third edited command indicates "the picture Z is subjected to the MR compression to be produced as the picture C".

The combining unit 19 may combine the elementary commands into the edited concatenated-command 17 either by deleting the succession of the particular and the inverse elementary commands from the succession of the elementary commands or by substituting the equivalent elementary command for the succession of the specific and the succeeding elementary commands.

In FIG. 2, an example of the edited concatenated-command 17 is illustrated in a bottom portion of the figure. As is obvious from FIB. 2, the edited concatenated-command 17 is the concatenation of the edited commands and is less in length that the input concatenated-command 13.

A command executing unit 20 is connected to the combining unit 19 of the command editing unit 16 and is supplied with the input picture 12. The command executing unit 20 executes the edited concatenated-command 17 for the input picture 12 to produce the processed picture 15. More specifically, the command executing unit 20 is responsive to the concatenation of the edited commands of the edited concatenated-command 17 and executes the edited commands one by one for the input picture 12 to produce the processed picture 15. The command executing unit 20 of the picture processing device 11 delivers the processed picture 15 to the host device 14 in order to request the host device 14 to supply the picture processing device 11 with a following input picture and a following input concatenated-command as the input picture 12 and the input concatenated-command 13.

What is claimed is:

1. A picture processing device, supplied with an input picture and an input concatenated-command for said input picture, for processing said input picture into a processed picture in compliance with said input concatenated-command, said device comprising:
   command editing means supplied with said input concatenated-command for editing said input concatenated-command into an edited concatenated-command which is equivalent in function to said input concatenated-command and is smaller in length than said input concatenated-command; and
   command executing means connected to said command editing means and supplied with said input picture for executing said edited concatenated-command for said input picture to produce said processed picture;
   said command editing means including
      a dividing means supplied with said input concatenated-command for dividing said input concatenated-command into elementary commands to successively produce said elementary commands as a succession of said elementary commands, and
      a combining means connected to said dividing means for combining said elementary commands into said edited concatenated-command by deleting, from said succession of said elementary commands, a succession of a particular one of said elementary commands and an inverse one of said elementary commands, said inverse one of said elementary commands immediately succeeding said particular one of said elementary commands in said succession of said elementary commands and being inverse in function to said particular one of said elementary commands.

2. A picture processing device as claimed in claim 1, wherein:
   said combining means further combines said elementary commands into said edited concatenated-command by substituting an equivalent elementary command for a succession of a specific one of said elementary commands and a succeeding one of said elementary commands, said succeeding one of said elementary commands immediately succeeding said specific one of said elementary commands in the succession of said elementary commands, said equivalent command being equivalent in function to a succession of said specific and said succeeding ones of said elementary commands.

3. A picture processing device, supplied with an input picture and an input concatenated-command for said input picture, for processing said input picture into a processed picture in compliance with said input concatenated-command, said device comprising:
   command editing means supplied with said input concatenated-command for editing said input concatenated-command into an edited concatenated-command which is equivalent in function to said input concatenated-command and is smaller in length than said input concatenated-command; and
   command executing means connected to said command editing means and supplied with said input picture for executing said edited concatenated-command for said input picture to produce said processed picture;
   said command editing means including
      a dividing means supplied with said input concatenated-command for dividing said input concatenated-command into elementary commands to successively produce said elementary commands as a succession of said elementary commands, and
      a combining means connected to said dividing means for combining said elementary commands into said edited concatenated-command by substituting an equivalent elementary command for a succession of a specific one of said elementary commands and a succeeding one of said elementary commands, said succeeding one of said elementary commands immediately succeeding said specific one of said elementary commands in said succession of said elementary commands, said equivalent elementary command being equivalent in function to a succession of said specific and said succeeding ones of said elementary commands.

4. A picture processing device, supplied with an input picture and an input concatenated-command for said input picture, for processing said input picture into a processed picture in compliance with said input concatenated-command, said input concatenated-command being a concatenation of input commands, said device comprising:
   command editing means supplied with said input concatenated-command for editing said input concatenated-command into an edited concatenated-command which is equivalent in function to said input concatenated-command and is smaller in length than said input concatenated-command; and
   command executing means connected to said command editing means and supplied with said input picture for executing said edited concatenated-command for said input picture to produce said processed picture; wherein said command editing means edits the concatenation of said input commands into a concatenation of edited commands so that the concatenation of said edited commands is equivalent in function to the concatenation of said input commands and is smaller in length that the concatenation of said input commands, the concatenation of said edited commands being for use as said edited concatenated-command; and said command executing means is responsive to the concatenation of said edited commands, for executing said edited commands one by one for said input picture to produce said processed picture.

5. A picture processing device as claimed in claim 4, wherein said command editing means comprises:

dividing means supplied with the concatenation of said input commands for dividing the concatenation of said input commands into elementary commands to successively produce said elementary commands as a succession of said elementary commands, each of said elementary commands being less in length than each of said input commands; and combining means connected to said dividing means for combining said elementary commands into the concatenation of said edited commands by deleting, from the succession of said elementary commands, a succession of a particular and an inverse one of said elementary commands, said inverse one of said elementary commands immediately succeeding said particular one of said elementary commands in the succession of said elementary commands and being inverse in function to said particular one of said elementary commands.

6. A picture processing device as claimed in claim 5, wherein:

said combining means further combines said elementary commands into the concatenation of said edited commands by substituting an equivalent elementary command for a succession of a specific and a succeeding one of said elementary commands, said succeeding one of said elementary commands immediately succeeding said specific one of said elementary commands in the succession of said elementary commands, said equivalent elementary command being equivalent in function to the succession of said specific and said succeeding ones of said elementary commands.

7. A picture processing device as claimed in claim 4, wherein said command editing means comprises:

dividing means supplied with the concatenation of said input commands for dividing the concatenation of said input commands into elementary commands to successively produce said elementary commands as a succession of said elementary commands, each of which is less in length than each of said input commands; and combining means connected to said dividing means for combining said elementary commands into the concatenation of said edited commands by substituting an equivalent elementary command for a succession of a specific and a succeeding one of said elementary commands, said succeeding one of said elementary commands immediately succeeding said specific one of said elementary commands in the succession of said elementary commands, said equivalent elementary command being equivalent in function to the succession of said specific and said succeeding ones of said elementary commands.

* * * * *